J. Jones.
Smoothing-Iron.
Nº 74372.   Patented Feb. 11, 1868.
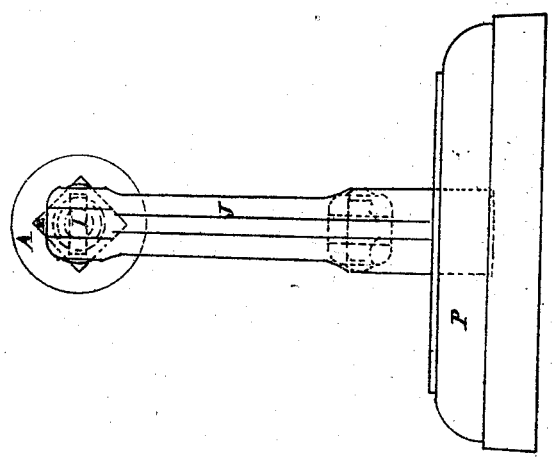
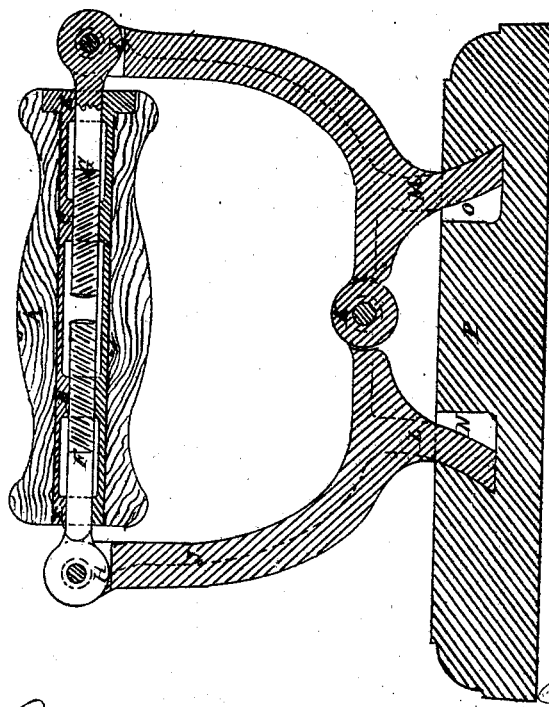
Witnesses
O. C. Woolson
Wm. H. Ansles
Inventor
John Jones

United States Patent Office.

JOHN JONES, OF NEWARK, NEW JERSEY.

Letters Patent No. 74,372, dated February 11, 1868.

IMPROVED SMOOTHING-IRON.

The Schedule referred to in these Letters Patent and making part of the same.

TO ALL WHOM IT MAY CONCERN:

Be it known that I, JOHN JONES, of the city of Newark, in the county of Essex, and the State of New Jersey, have invented a new and useful Smoothing-Iron with detached handle; and I hereby declare that the following is a full, clear, and exact description of the construction and operation of the same, reference being had to the annexed drawings, making part of this specification.

Figure 1 is a vertical section,

Figure 2 a transverse section of the same.

The handle, A, fig. 1, which is of wood, has a right and left-hand screw-nut, B and C, and two guide-pieces, D and E, attached together by metallic connections, and firmly fixed within the handle. The right and left-hand screws F and G pass through the guide pieces D and E, and are screwed within their respective nuts B and C, as shown in the drawing. These screws F and G are attached by hinge-joints H and I to the handle-frame J. The two sides of the handle-frame are connected together by a hinge, K, and have at their lower extremities angle-pieces, L and M, which are made to fit the corresponding mortises N and O, cast in the body of the smoothing-iron P.

When the handle-apparatus is to be attached to the iron, the handle A is turned, so the upper part of the frame J is thrown apart by the action of the nuts B and C upon their respective screws, thus bringing the angle-pieces L and M together, so as to admit them into the mortises N and O of the iron, P, when, by reversing the motion of the handle A, the upper part of the frame J is brought together, until the angle-pieces L and M are firmly tightened within their respective mortises.

It is not absolutely necessary that two screws should be used in this arrangement, as one screw and a pivot-end operating upon the handle A would produce the same effect. But the two screws, each having two or more threads, are much the best, as they greatly facilitate the attaching and detaching of the handle to the iron.

I do not claim the movable handle-apparatus, in combination with a smoothing-iron, as various devices have been invented for that purpose; but I do claim one or more screws, in combination with a handle and movable handle-frame, as described in this specification, or its equivalent, for the purpose specified.

I also claim the smoothing-iron with mortises, or its equivalent, in combination with a movable handle, when operated on by one or more screws, as described, and for the purpose specified.

JOHN JONES.

Witnesses:
    O. C. HOOLSON,
    WM. H. INSLEE.